March 26, 1929.  G. BERNERT  1,707,206
METHOD AND APPARATUS FOR CONVEYING BRAN OR SIMILAR LIGHT MATERIAL
Filed Aug. 19, 1920
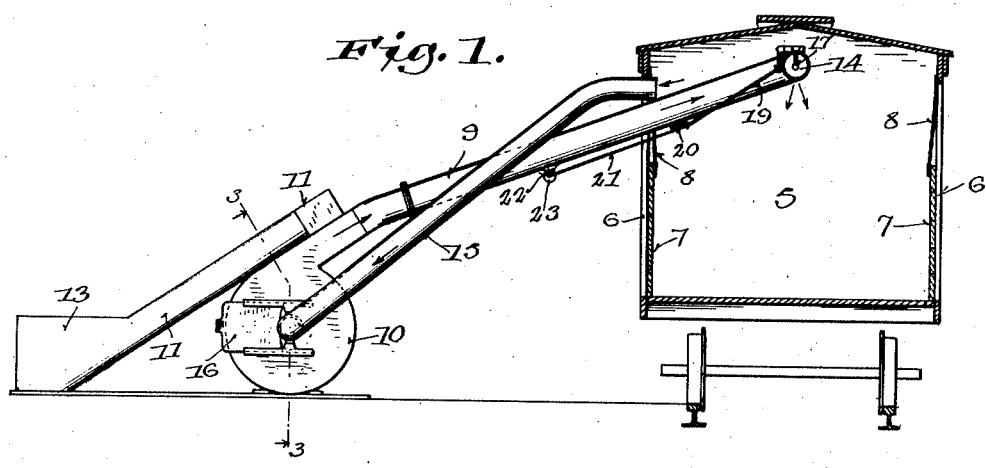
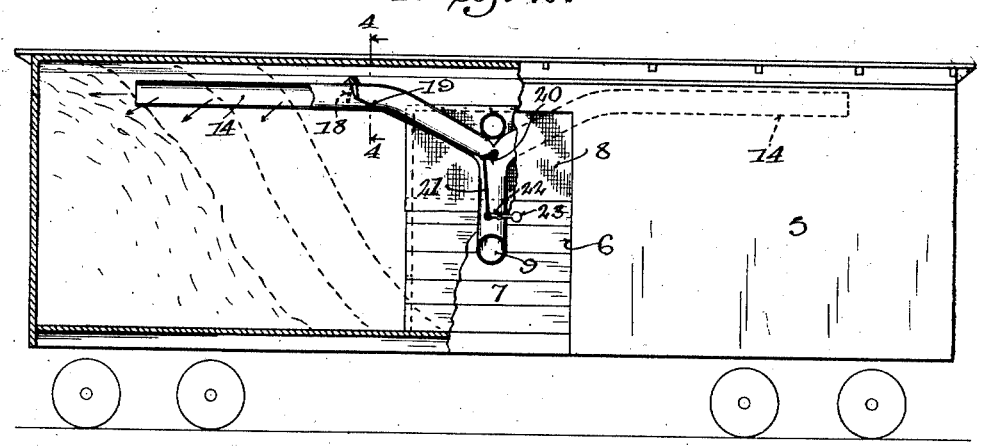
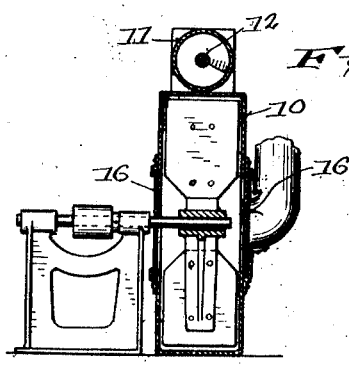
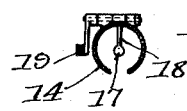
George Bernert INVENTOR.
BY
Frank L. Ratcliffe ATTORNEY.

Patented Mar. 26, 1929.

1,707,206

UNITED STATES PATENT OFFICE.

GEORGE BERNERT, OF MILWAUKEE, WISCONSIN.

METHOD AND APPARATUS FOR CONVEYING BRAN OR SIMILAR LIGHT MATERIAL.

Application filed August 19, 1920. Serial No. 404,591.

My invention relates to new and useful improvements in pneumatic conveying apparatus for bulk materials, and is particularly directed to the provision of an improved method and means of conveying such light materials as bran and certain fertilizers, and loading such materials in a freight car or other receptacle.

In conveying grains or the like by pneumatic pressure current conveying apparatus, the weight of the grain effects a proper settling thereof in the receptacle into which it is discharged, and the momentum stored in the grain incidental to its conveying movement is sufficient to carry the grain a desired distance from the point of discharge of the apparatus so that a freight car or other receptacle may be conveniently loaded by the simple discharge of the grain thereinto.

In conveying bran or other lighter material, however, the same will not readily settle into the receptacle into which it is discharged by a pressure current of air and it is hence necessary to close the door opening of a freight car, or the inlet of any other receptacle when the material is discharged thereinto for loading to prevent the lighter parts of the material from swirling out into the atmosphere. Such closing of the receptacle however creates a compression of air in the freight car or other receptacle producing a back pressure action on the conveying pressure current of air, and if the material is discharged from approximately the center of the car, pressure pockets are formed in the upper end portions of the car or receptacle as the loading proceeds, inasmuch as the material will not carry by momentum to the end of the car, these pockets preventing said upper end portions from being filled with the material, since the conveying current will be retarded and the grain will tend to choke the points of ingress to the upper end portions of the car.

It is therefore primarily the object of my invention to provide an improved method of conveying and loading freight cars or other receptacles with bran or similar light materials by a pressure current of air in such manner that a free discharge of the material into the receptacle is effected without substantial loss incidental to relieving back pressure, and further in such manner that the entire volume of the receptacle may be quickly and conveniently filled.

A further important object of my invention resides in the provision of an improved apparatus for loading freight cars or other receptacles with bran or light material wherein means is provided for relieving back pressure of air in the receptacle without loss of the material conveyed, and wherein means is further provided for insuring the complete filling of the car or other receptacle from end to end.

A still further object resides in the provision of means for indicating the amount of material deposited into a freight car or other closed receptacle so that the completion of the loading operation may be readily determined inasmuch as a visual determination of the contents of the receptacle is rendered highly difficult by the closed condition of the receptacle and by the amount of material maintained in suspension therein.

With the above and other objects and advantages in view, my invention resides more particularly in the novel combination, formation and arrangement of parts hereinafter described and pointed out in the appended claims.

In the accompanying drawings:

Figure 1 is a side elevational view of my improved apparatus for loading bran and similar light material and showing the apparatus associated with a freight car in transverse cross-section;

Figure 2 is a view taken longitudinally through the car and showing the method of loading the same;

Figure 3 is a transverse sectional view on the line 3—3 of Figure 1;

Figure 4 is a detailed sectional view on the line 4—4 of Figure 2.

Referring now more particularly to the accompanying drawings, 5 designates the body of a freight car, although my invention may be associated with any storage receptacle, and 6 designates the doorway of the car, which, for the purpose of loading same with bran or the like is boarded throughout its major and lower portion at 7 and is covered with burlap 8 or other closure means at its top through which is projected an air pressure current conveying duct 9 which extends from a blower fan casing 10 located adjacent the point of loading, said fan casing being provided with the usual intake openings at its central side portions. A feed conveyer casing 11, having a positive feed conveyer 12 therein, communicates with the duct 9 preferably adjacent the fan and terminates at one end in a loading hopper or boot 13. In the present structure, the duct 9 is branched in the upper central portion of the freight car or other receptacle and is provided with extensions 14 extending longitudinally along the top of the car to points adjacent the ends thereof, these duct extensions being longitudinally open at their bottom portions and constituting what may be termed guide hoods for the material to be conveyed. A back pressure relieving duct 15 extends from one of the intake openings of the fan casing to the receptacle and passes through the burlap closure of the present arrangement at a point above the point of ingress of the conveying duct 9. Passage of air through the two intake openings of the fan casing is adjustably controlled in the present instance by a sliding valve plate 16 movable across each opening.

Thus, in the operation of the present embodiment of my invention, the bran or light material is fed into the conveying duct 9 and passes therethrough into the car and through the hood branches 14, being discharged from the ends of said branches at the upper corner portions of the car. The branches 14 obviously serve to confine the current and hence maintain the light particles of material in movement to the ends of the car. As the ends of the car fill up, the ends of the extensions are naturally closed and the material passes from the extensions through the bottom apertures thereof, being thus deposited in the car in substantially vertical accretions toward the center thereof until the car has been filled, in contradistinction to the heretofore employed method of loading bulk materials of any nature by building up the accretions from the floor, and by this improved method of discharging the material to the upper end corners or corner of a receptacle and then gradually shifting the point of deposit of material inwardly, I avoid the occurrence of a dead pressure space in the upper corners or corner of the receptacle which would prevent the filling thereof by bran or light material, it being appreciated that the conveying of grain or similar material would effect a proper filling by the stored momentum of the heavier material. When the car has been filled in this manner, the hood extensions 14 may be withdrawn, but it will be however appreciated that the inward shifting of the point of deposit of material may be also effected by shifting the discharge end of the conveying duct toward the center of the car as the loading proceeds, and while I have shown the duct 9 branched, for simultaneously loading both ends of the car, either end may be loaded singly.

As the pressure current of air and its carried material is discharged into the freight car or receptacle, a compression of the air within the closed receptacle obviously takes place and, were no means of egress provided, this compression would quickly become so great as to choke the conveying duct 9 and prevent the conveying action of material. Were a direct vent means into the air afforded, however, the material in suspension would be discharged into the atmosphere and hence lost. I have found from experience that, if the air forced into the closed receptacle, by the blower 10, is permitted to escape at a rate equal to its entrance, the tendency of the suspended material to escape is largely eliminated.

This is effected in the present instance by the return duct 15 which enters the fan and, in the operation of my device, air is taken into the fan through the duct 15 and also through the open side of the fan, the conditions of intake from the duct 15 being such that a balanced pressure is maintained in the duct 15, this pressure being such as to relieve the compression conditions within the receptacle to permit carrying on the conveying operation while at the same time the creation of an excessive venting current is avoided with the consequence that very little if any of the light work material is carried back through the duct 15, and any work material which might be carried back, constituting very light particles, would be carried through the fan and brought back into the system without damage. The connection of the duct with the fan casing however is not essentially for the purpose of retrieving vented material, but for the purpose of procuring the proper degree of retardation of flow of the vented air and a definite control of such retardation. The back pressure action in the duct 15 may be adjusted by adjusting either or both of the slide valves 16 of the fan casing to vary the amount of air introduced in the system through the open side. If desired, it is obvious that the point of egress of vented air may be located otherwise than at the center of the car or receptacle, and other means than the primary fan 10 may be employed for providing a back pressure opposition to the venting flow of air.

In view of the closing of the interior of the receptacle during the loading operation, and also in view of the fact that the atmosphere of the receptacle is so charged with flying particles as to practically render it visually impenetrable, it has heretofore been very difficult to gage the filling of a freight car or other receptacle by an air current in conveying bran or similar material so that the conveying operation may be stopped at the proper time, and to overcome this disadvantage, I provide a visual signal means extending exteriorly of the receptacle and operable by the conveying air current and material within the receptacle. The present embodiment of this signal comprises a small plate 17 carried by a stem 18 hinged within one of the duct branches 14, it being incidentally noted that a signal arrangement may be provided for each branch. This stem is connected by a link 19 with a pivoted arm 20 mounted adjacent the inner end of the duct 9, and said arm is in turn connected by a link 21 with the inner end of a lever 22 intermediately pivoted in the wall portion of the duct 9 exteriorly of the car or other receptacle to be loaded. The outer end of the arm 22 carries a signal plate 23, and thus as material is conveyed through the duct, the pulsating pressure of air and impact of material against the plate 17 will cause the same to vibrate and this vibration will be transmitted through the link arrangement described to the plate 23, causing said plate 23 to be vibrated and thus afford a visual signal that the conveying action is being carried on. As the load line of material approaches the center of the car, the plate 17 will be submerged therein, thus halting its vibrating action and the vibrating action of the plate 23 will be correspondingly halted, thus indicating that the car has become filled or nearly filled so as to afford the proper determination with respect to control of the loading operation.

While I have shown and described a preferred embodiment of my invention, it will be understood that various changes and modifications of structure may be employed to meet differing conditions of use and manufacture without departing in any manner from the spirit of my invention.

What is claimed is:

1. The method of loading bran and similar light material into a receptacle by a pressure current of air which consists in substantially closing the receptacle, in discharging the pressure current of air and conveyed material into the receptacle, in providing a vent for air discharged into the receptacle and in associating means with said vent for controlling the pressure of air in the receptacle and the discharge velocity of the air therefrom whereby the loss of fine material is overcome.

2. An apparatus for loading a receptacle with bran and similar light material comprising a blower fan casing provided with inlet openings, a fan in said casing, a conveying duct extending from said casing and adapted for introduction into a receptacle, means for introducing material to be conveyed into said duct, a return pressure duct communicating with one of the inlet openings of the fan casing and adapted to be introduced in the receptacle to relieve the accumulations of air therein, and means for adjustably controlling flow of air through the other inlet opening of the fan casing whereby to control the back pressure conditions of air in the return duct.

3. An apparatus for loading a receptacle with bran or similar light material comprising a conveying duct, means for procuring a pressure current of air in said duct, means for introducing material into said duct to be conveyed, and a terminal discharge extension for said duct provided with a longitudinal opening to permit discharge of air and material at progressive points along said extension.

4. An apparatus for loading a receptacle with bran or similar light material comprising a conveying duct, means for procuring a pressure current of air in said duct, means for introducing material into said duct to be conveyed, said duct being branched, and extensions connected with the branches of the duct and adapted to extend longitudinally in a receptacle to be loaded, said branches being provided with longitudinal openings to permit discharge of air and material at progressive points along said extensions.

In testimony that I claim the foregoing I have hereunto set my hand at Milwaukee, in the county of Milwaukee and State of Wisconsin.

GEORGE BERNERT.